J. P. ZOLLER.
GRAIN BUCKET.
APPLICATION FILED JUNE 1, 1909.

948,365.

Patented Feb. 8, 1910.

2 SHEETS—SHEET 1.

WITNESSES
L. H. Ellis.
E. M. Ricketts.

INVENTOR
John P. Zoller
By Watson E. Coleman
Attorney

J. P. ZOLLER.
GRAIN BUCKET.
APPLICATION FILED JUNE 1, 1909.

948,365.

Patented Feb. 8, 1910.

2 SHEETS—SHEET 2.

WITNESSES
L. H. Ellis.
E. M. Ricketts.

INVENTOR
John P. Zoller
By Watson E. Coleman
Attorney

UNITED STATES PATENT OFFICE.

JOHN P. ZOLLER, OF CASCADE, IOWA.

GRAIN-BUCKET.

948,365.  Specification of Letters Patent.  Patented Feb. 8, 1910.

Application filed June 1, 1909. Serial No. 499,293.

*To all whom it may concern:*

Be it known that I, JOHN P. ZOLLER, a citizen of the United States, residing at Cascade, in the county of Dubuque and State of Iowa, have invented certain new and useful Improvements in Grain-Buckets, of which the following is a specification, reference being had to the accompanying drawings.

This invention relates to improvements in buckets or similar receptacles by means of which grain and other material may be conveniently carried and handled.

The object of the invention is to provide a simple and practical dumping bucket or the like of such size that a plurality of them may be placed in a wagon box to conveniently transport grain or the like from the farm to the mill, granary or elevator and from which grain may be quickly discharged after the bucket has been elevated by a suitable hoisting device over the bin or the place where it is desired to deposit the grain.

With the above and other objects in view, the invention consists of the novel features of construction and the combination and arrangement of parts hereinafter fully described and claimed, and illustrated in the accompanying drawings, in which—

Figure 1:
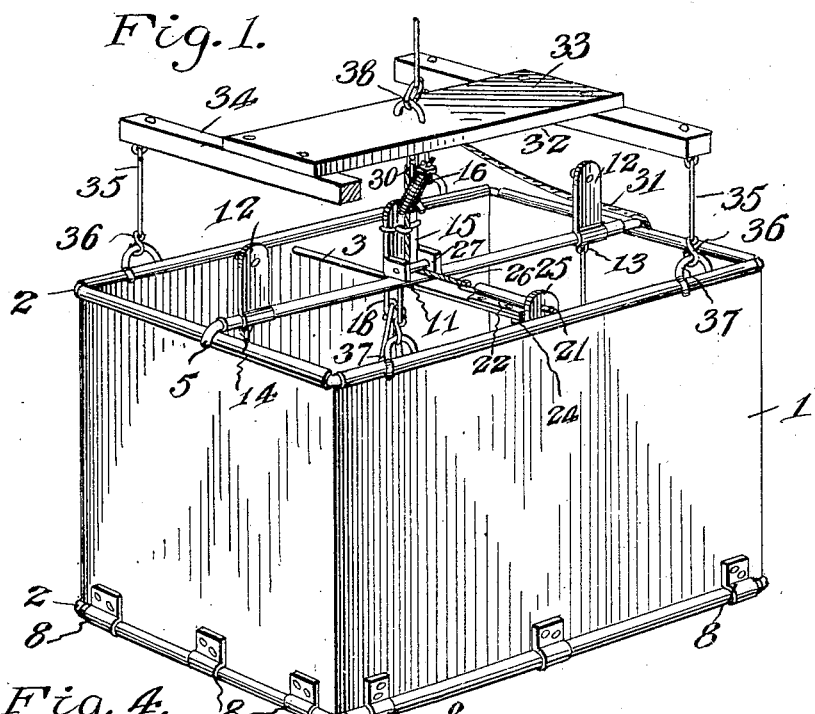
Figure 4:
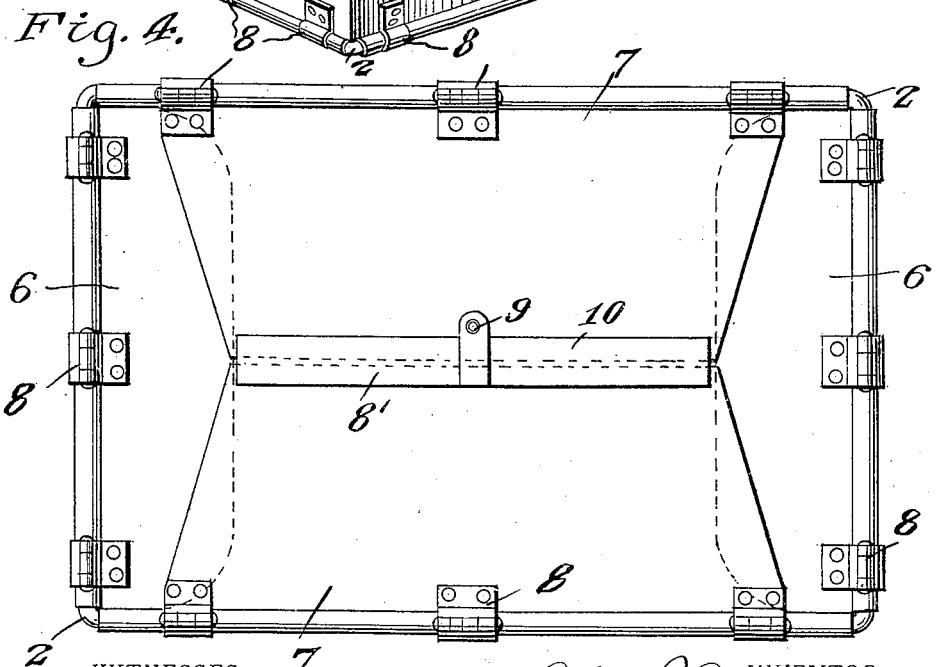
Figure 2:
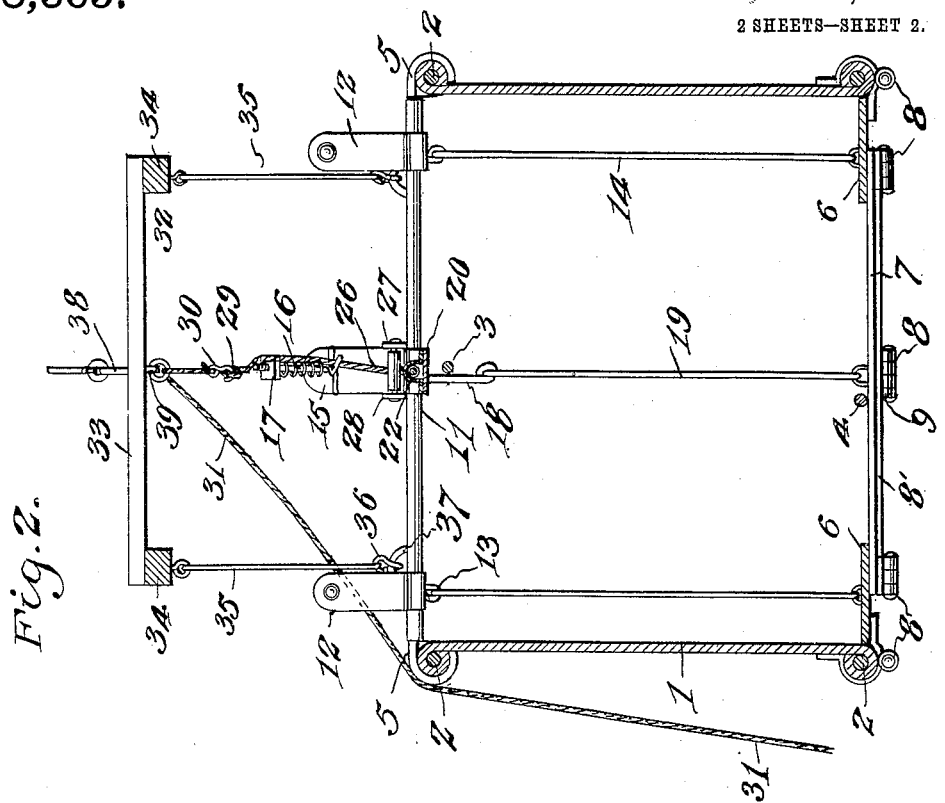
Figure 3:
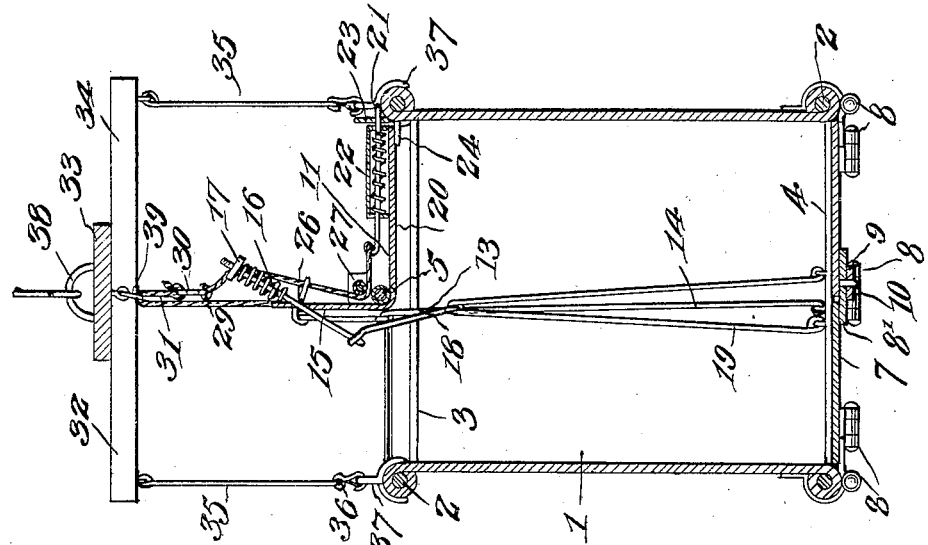

Figure 1 is a perspective view of my improved grain bucket showing the elevating device attached to it; Figs. 2 and 3 are vertical longitudinal and transverse sectional views; and Fig. 4 is a bottom plan view of the bucket.

My improved bucket comprises a body 1 preferably of rectangular shape, as shown. It may be made of metal, wood, canvas or other material but, as illustrated, it is constructed of sheet metal and has its open upper and lower ends reinforced by rectangular frames 2 about which the edges of the sides and ends of the sheet metal body are bent. The body may be strengthened by upper and lower transverse rods 3, 4 and also by a longitudinally extending rod 5 arranged at its top.

The lower open end of the body is adapted to be closed by end and side bottom sections 6, 7, each of which is united to the body by a plurality of hinges 8 so that said bottom sections will swing downwardly to discharge the contents of the body. The end sections 6 are adapted to swing up in advance of the side sections 7 so that the latter support the former and to hold the side sections 7 in alinement when they are in closed position, one of them has an overlapping flange 8' provided with an apertured ear 9, the aperture in which latter receives a pin or stud 10 upon the bottom of the other section 7, as clearly shown in Fig. 4 of the drawings. The upward or closing movement of the sections 7 is limited by the lower cross bar 4.

For the purpose of closing the bottom sections 6, 7 and maintaining them in closed position, a longitudinal rock shaft 11 is provided. This shaft is preferably of tubular form to rotate upon the upper longitudinal rod 5 and adjacent its ends are arms 12 which are connected by short and long links 13, 14 to the end bottom sections 6. At the center of the rock shaft 11 is a third arm 15 provided with a guide aperture in which a cushioning link or rod 16 is slidably arranged. A coil spring is arranged on the rod 16 between the arm 15 and an adjusting nut or stop 17 and the lower end of said rod 16 has its eye connected by a short link 18 to the upper ends of two long links 19, the lower ends of which latter are connected to the side bottom sections 7. This cushioning or spring connection for the links of the sections 7 of the bottom permit the latter to fully open when the bucket is being dumped.

20 denotes an arm projecting from the tubular rock shaft 11 and extending in a plane substantially at right angles to that of the arm 15. On said arm 20 is a sliding bolt 21 arranged in a guide 22 and adapted to engage a keeper 23 provided on one of the side walls of the bucket. This keeper is in the form of an angular plate having a horizontal stop portion 24 to limit the movement of the arm 20 and an upwardly and outwardly curved apertured portion which receives the bolt 21. Said bolt is spring actuated and has the eye at its inner end connected to one end of a flexible element 26 such as a cable. This element extends around two guides 27, 28 provided on the arm 15 and an eye or ring 29 at the other end of said element 26 is adapted to be engaged by a snap hook 30 on a trip rope or cable 31.

To permit the bucket or receptacle to be conveniently picked up by a hoisting mechanism, I provide a detachable lifting and suspending frame 32. This frame is adapted for use in connection with any one of a number of the buckets and is made detachable for that purpose. It preferably consists of a longitudinal member 33 having at its ends cross arms 34 from which swing links 35 carrying snap hooks 36 for engagement with eyes or loops 37 arranged on the upper edges of the bucket body 1 adjacent its four corners. The provision of the snap hooks 36 permits the lifting frame to be readily applied to the bucket when it is desired to lift the same and as readily removed from the same when the bucket has been placed in the desired position. Arranged at the center of the longitudinal member 33 of the frame is a hanging bolt 38 provided at its top with an eye or hook for engagement with a hoisting mechanism and at its lower end with a guide eye 39 for the trip rope 31.

In use, when the arm 20 is swung to a horizontal position and the bolt or catch 21 is engaged with the keeper 23 the bottom sections of the bucket will be held in closed position so that the bucket may be filled with grain or other material. When it is desired to move the bucket the lifting frame 32 is applied to its top and then engaged with a suitable hoisting or hoisting and conveying apparatus. When the bucket reaches the point where it is desired to discharge its contents, the trip rope 31 is drawn upon to retract the catch 21, whereupon the weight of the contents of the bucket swings the bottom sections 6, 7 of the same downwardly to open position to permit of the discharge of the grain or other contents. The bucket may be closed by simply swinging the arm 20 downwardly to a horizontal position so that the spring catch or bolt 21 engages its keeper 23.

While I have shown and described my invention as especially adapted for the use of a farmer in transporting his grain to the market or his granary, it will be understood that it may be used in other ways and for other purposes.

Various changes in the form, proportion and arrangement of parts and in the details of construction may be resorted to within the spirit and scope of the invention.

Having thus described the invention what is claimed is:

1. A device of the character described comprising a rectangular body, downwardly swinging bottom sections hinged to the ends and sides of said body, a longitudinal rock shaft journaled upon the body, arms on said rock shaft adjacent its ends, links connecting said arms to the end bottom sections, another arm on the rock shaft adjacent its center, a link having a resilient connection with the last mentioned arm, a pair of links connecting the last mentioned link to the side bottom sections, and means for retaining the rock shaft in adjusted position.

2. A device of the character described comprising a rectangular body, downwardly swinging bottom sections hinged to the ends and sides of said body, a longitudinal rock shaft journaled upon the body, arms on said rock shaft adjacent its ends, links connecting said arms to the end bottom sections, another arm on the rock shaft adjacent its center, a link having a resilient connection with the last mentioned arm, a pair of links connecting the last mentioned link to the side bottom sections, a fourth arm upon said rock shaft, a spring catch carried by said fourth arm, a keeper upon one side of the body to receive said catch, and means for disengaging said catch from its keeper.

3. A device of the character described, comprising a body, swinging bottom sections, a rock shaft journaled in the body, an arm on said rock shaft, and formed with an opening, a rod slidable in said opening and carrying a shoulder, a coil spring on said rod between said arm and said shoulder, connections between said rod and said bottom section, and means for retaining said rock shaft in adjusted position.

In testimony whereof I hereunto affix my signature in the presence of two witnesses.

JOHN P. ZOLLER.

Witnesses:
  M. F. KURT,
  C. F. CRAWFORD.